United States Patent [19]

Tuten et al.

[11] Patent Number: 4,538,100
[45] Date of Patent: Aug. 27, 1985

[54] DC TO AC INVERTER AND MOTOR CONTROL SYSTEM

[75] Inventors: William J. Tuten, Scottsdale; Kennith D. Crosby, Carefree; Bertil R. Bergquist, Mesa, all of Ariz.

[73] Assignee: Creative Technology, Inc., Scottsdale, Ariz.

[21] Appl. No.: 128,858

[22] Filed: Mar. 10, 1980

[51] Int. Cl.³ .............................................. H02P 5/40
[52] U.S. Cl. ...................................... 318/808; 318/803
[58] Field of Search ............... 318/762, 808, 803, 807, 318/809–811

[56] References Cited

U.S. PATENT DOCUMENTS

| | | | |
|---|---|---|---|
| 3,675,699 | 7/1972 | Johnston | 318/762 |
| 4,090,115 | 5/1978 | Franz, Jr. | 318/139 |
| 4,091,294 | 5/1978 | Zankl et al. | 318/808 |
| 4,217,527 | 8/1980 | Bourke et al. | 318/139 |
| 4,282,465 | 8/1981 | Acker et al. | 318/139 |

OTHER PUBLICATIONS

Le-Huy et al., "Microprocessor Control of a Current-Fed Synchronous Motor Drive," Conference: Industry Applications Society IEEE-IAS Annual Meeting, Cleveland Oh., (Sep. 30–Oct. 4, 1979), p. 873.
Eisenhaure et al., "High Efficiency Controlled Slip Induction Motor Drive for Electric Vehicles," Conference: Proceedings of the 14th Intersociety Energy Conversion Engineering, Boston, Ma. Aug. 5–10, 1979.
Lukas, "Microprocessor Control of a AC Drive," Conference: Industry Applications Society IEEE-IAS Annual Meeting, Cleveland, (Sep. 30–Oct. 4, 1979), pp. 881–885.

Primary Examiner—David Smith, Jr.
Attorney, Agent, or Firm—Weiss & Holloway

[57] ABSTRACT

This relates to a low cost reliable controller which may be used in conjunction with induction motors or, more generally, to generate AC power from a DC source. The system utilizes a microprocessor in combination with low cost parallel transistors to provide the control function. A feedback module monitors the actual rotor speed and conveys this information back to the microprocessor. A voltage boost module may be used in combination with the microprocessor and switching circuits to optimize the overall efficiency of the system. The microprocessor computes slip and controls the voltage drive in order to further optimize efficiency of the system as a function of motor speed. Both the footfeed voltage and boosted voltage are analog voltages and are applied to an A/D converter. The output of the A/D converter presents a digital representation of the footfeed voltage or boost voltage to the microprocessor.

7 Claims, 23 Drawing Figures

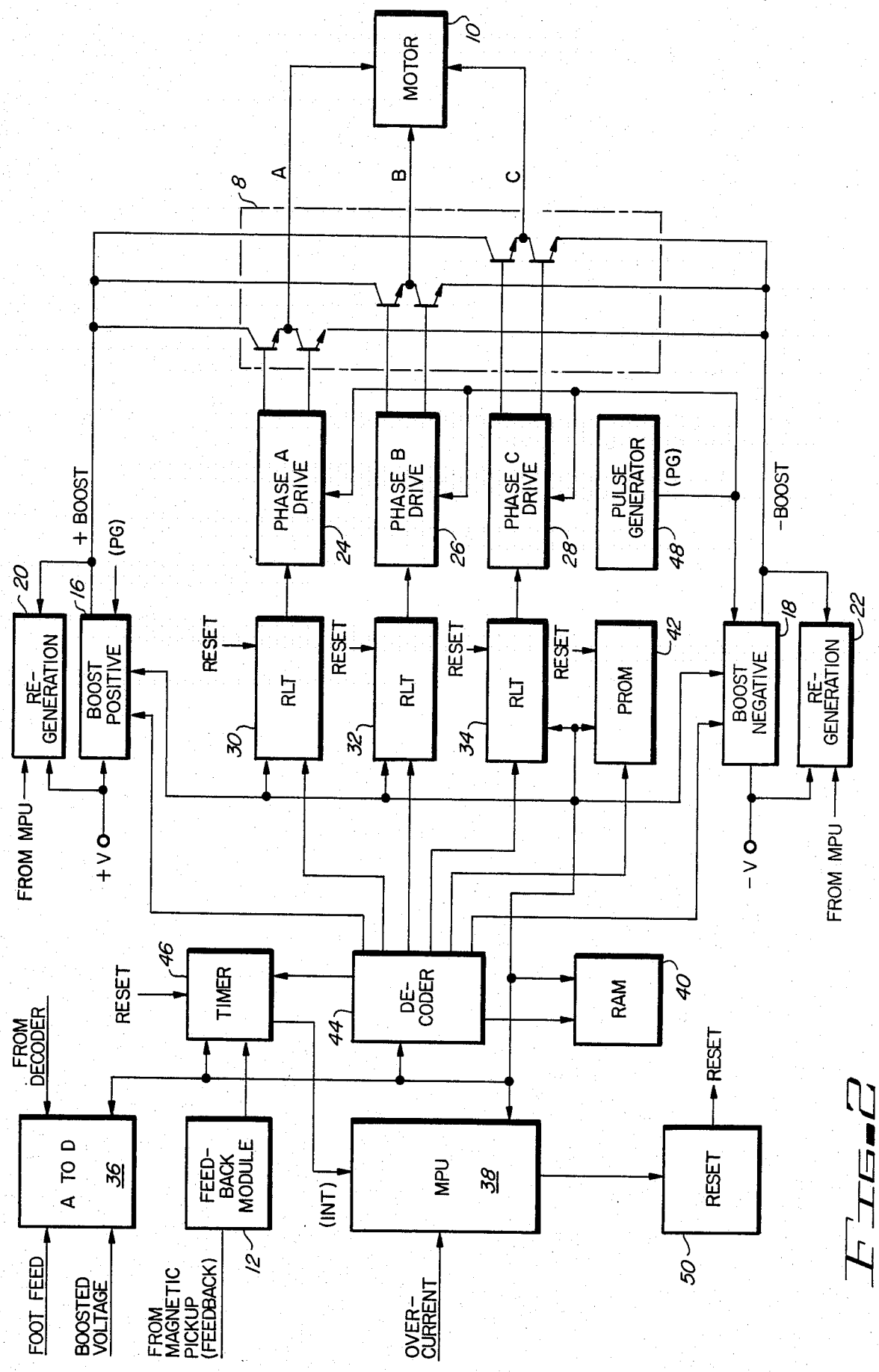

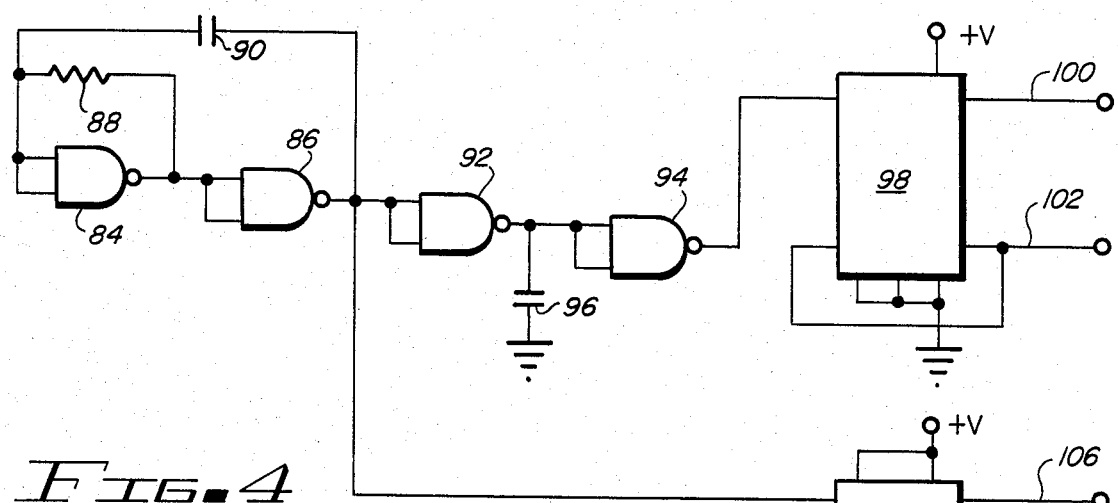
FIG.4
FIG.6
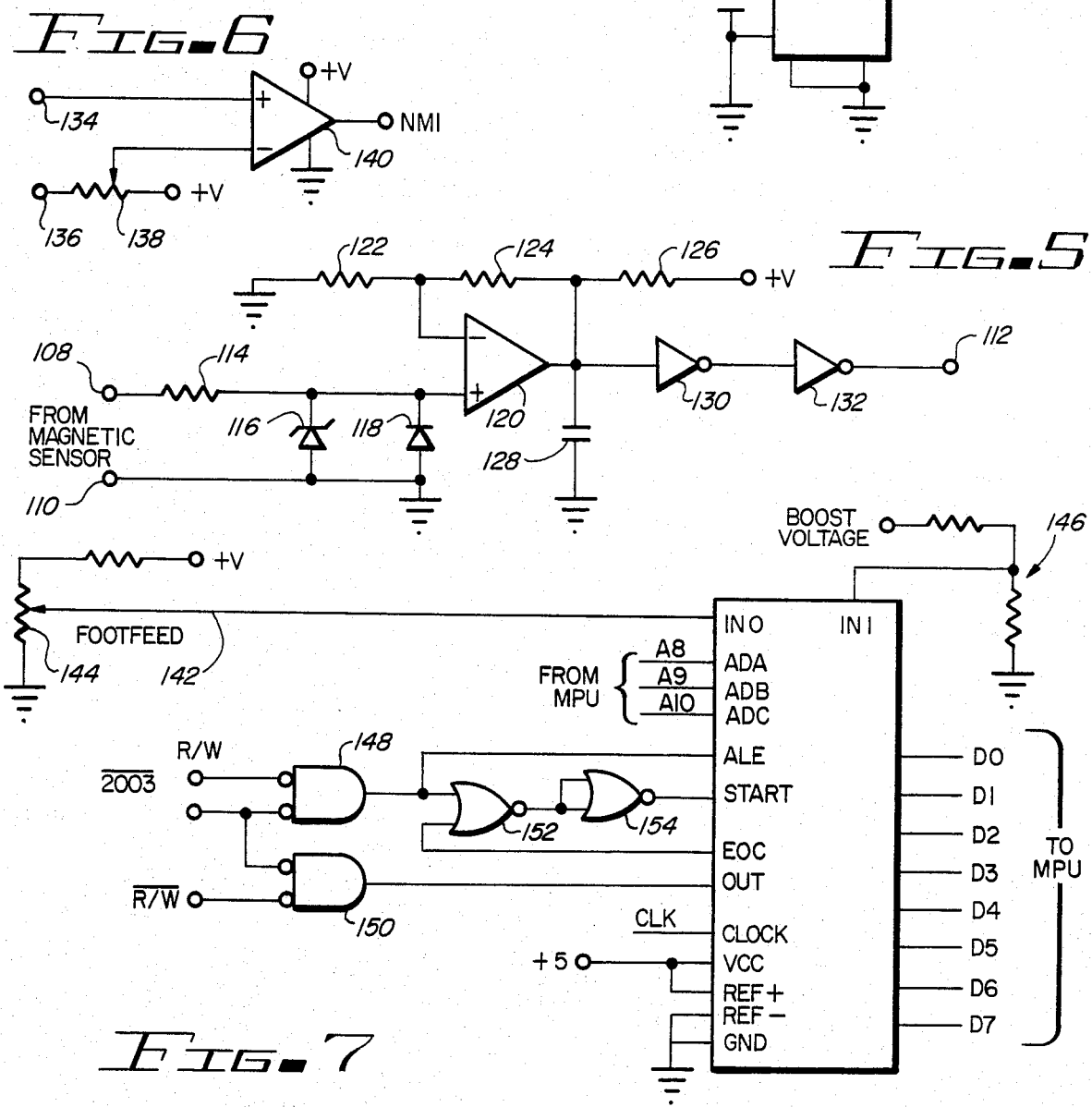
FIG.5
FIG.7

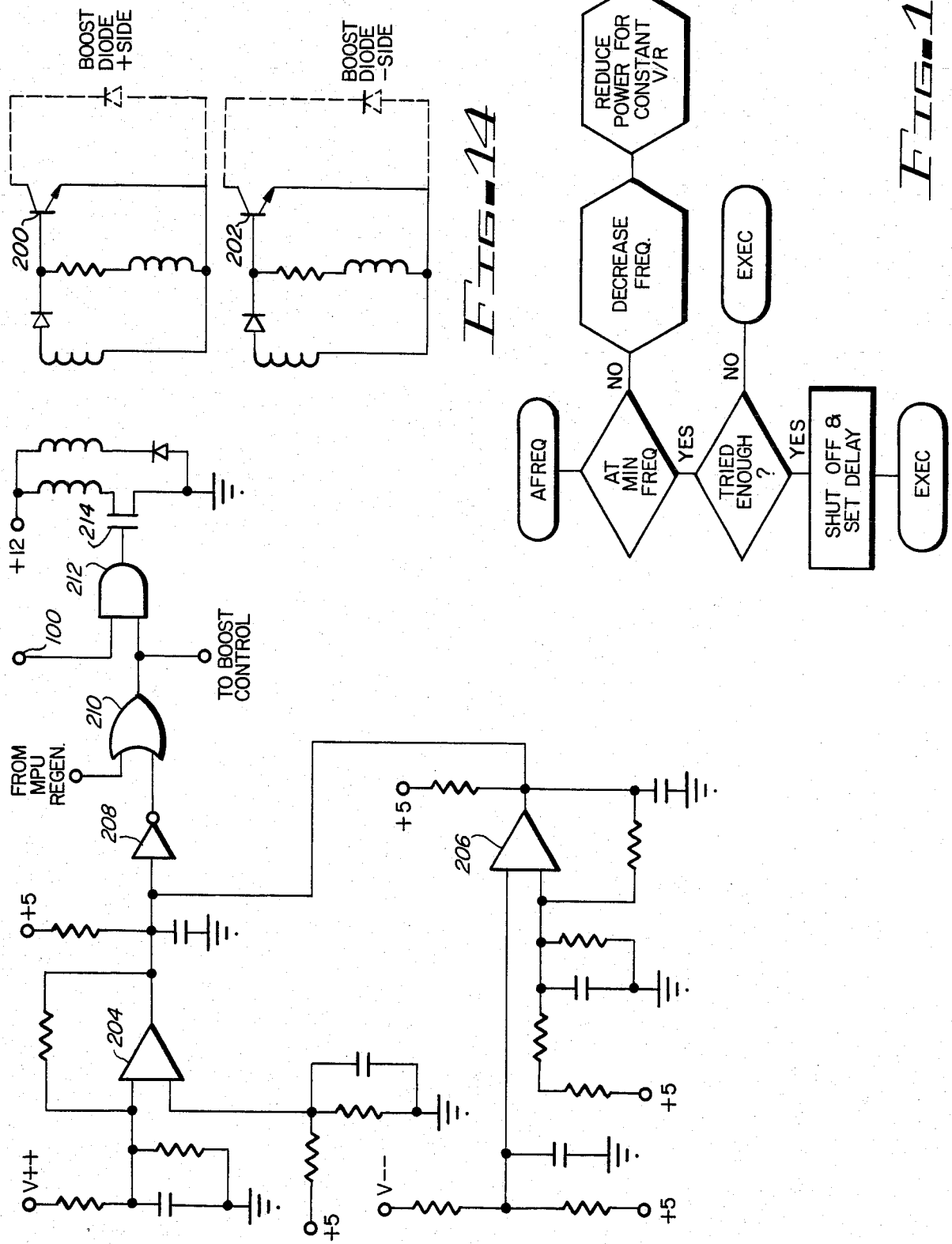

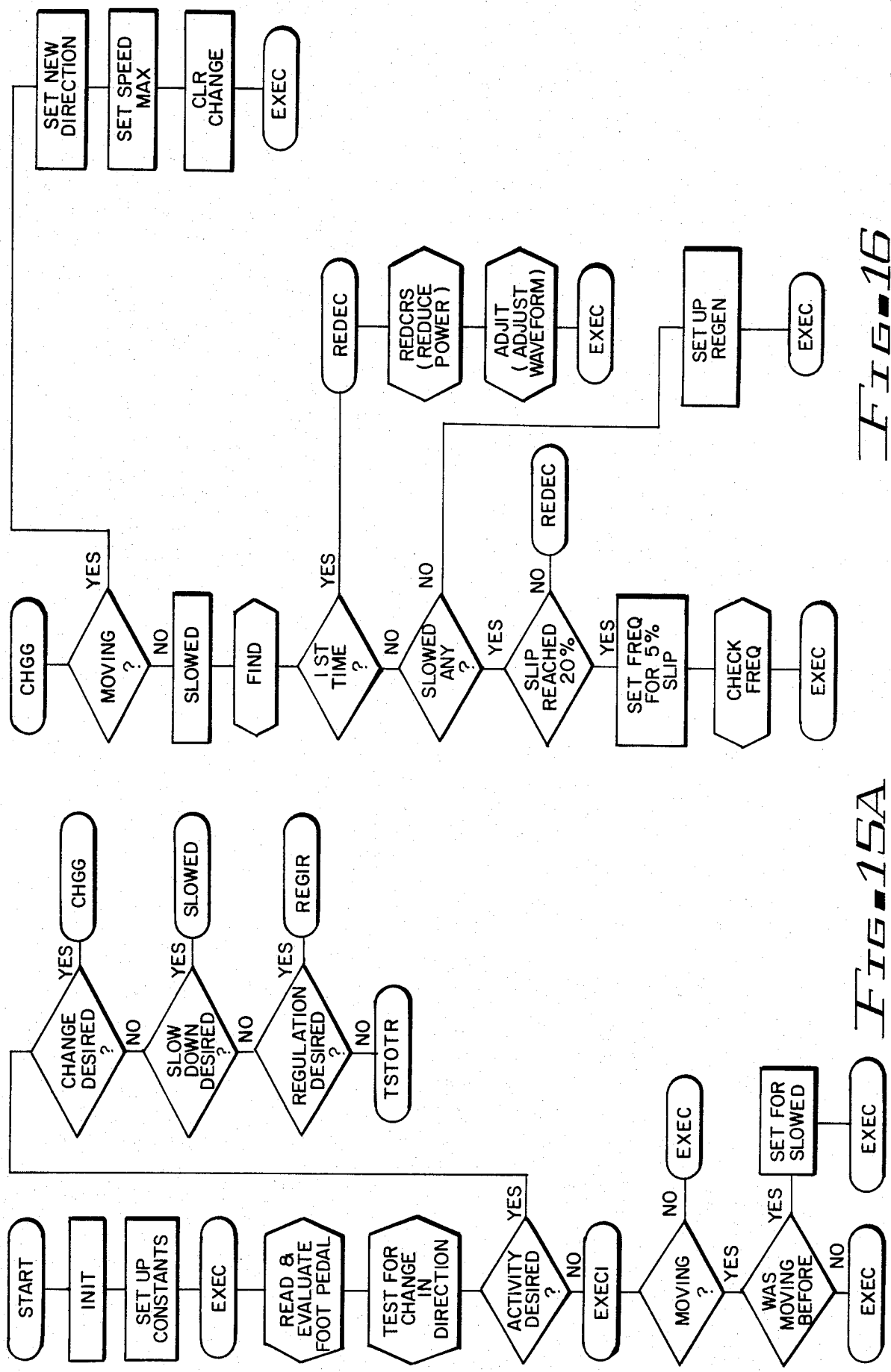

DC TO AC INVERTER AND MOTOR CONTROL SYSTEM

BACKGROUND OF THE INVENTION

1. Field of the Invention

This invention relates generally to a DC to AC inverter system, and, more particularly, to an AC motor control system.

2. Description of the Prior Art

Variable speed motor drive circuits are well known and are used to provide easy and versatile control of powered drive systems. There are two basic types of speed control systems; one for DC or universal motors and the other for AC induction motors. A DC motor control system requires a minimum of power and control circuitry, but the DC motor is itself expensive to purchase and maintain. The electronic control system for an AC motor is more complex, but this is offset by the economic advantage of using an AC motor, the cost of which may range from one-half to one-fifth the price. Moreover, since an AC motor has no brushes or commutators, it requires less maintenance, is more rugged and reliable, and can operate in explosive, dusty, or highly humid atmospheres and at high altitudes. In addition, AC motors can have higher maximum speeds than DC motors and can be liquid cooled. These advantages, when coupled with the availability of standard rated motors, make AC motors more attractive for most industrial applications than DC motors.

The speed of an AC induction motor is controlled by varying the amplitude and/or frequency of its supply voltage. The variable voltage, fixed frequency technique has the disadvantage that the maximum torque of the motor is proportional to the square of the applied voltage; therefore, this control method is effective over only small torque ranges. Better speed control is obtained through the use of a variable frequency drive system, but certain motor characteristics may represent restraints which limit the overall effectiveness of this approach. Generally, the best speed control is obtained through a system which varies frequencies, voltage and the number of pulses per half cycle.

Regardless of what type of speed control apparatus is used, a motor must be operated within its nameplate ratings. This rating gives the safe torque and speed limits for the motor as determined by the temperature limit, maximum safe rotational speed and the saturation limit of the iron used in the motor. To keep from saturating the iron, the RMS stator voltage must be proportional to the frequency of this voltage. In this case, the maximum producible torque is independent of the frequency of the applied voltage. However, maximum torque occurs at a particular value of slip at a particular supply frequency. Slip is defined as $(f_{stator}-f_{rotor})/f_{stator}$ where $f_{stator}$ is the stator frequency and $f_{rotor}$ is the rotor frequency. By properly controlling the slip, the operating characteristics can be optimized and power requirements for a given load minimized. Further, by controlling the slip, it is possible to achieve a high torque-to-current ratio.

Two types of circuits are used to provide variable frequency alternating voltages for motors. These are commonly referred to as inverters and cycloconverters.

A cycloconverter changes the frequency of a three phase alternating power source without the necessity of an intermediate AC to DC conversion stage. Cycloconverters require multiple control devices with three phase excitation, and are limited to low output frequencies. The output of a cycloconverter has a relatively large ripple voltage, but comparatively small ripple current which is what contributes to motor heating. The higher the output frequency, the greater the ripple current since there are fewer supply pulses per output cycle. This limits the practical upper frequency for a cycloconverter to one-sixth supply frequency if a half-wave converter is used, and to one-third the supply frequency if a full wave converter is used.

The preference for AC motors and the reasons therefore have been described above. However, in many cases only direct current power sources (e.g. batteries) are available. For example, the recent energy crisis has resulted in the pursuit of electric vehicles which are both reliable and efficient. It is therefore necessary that means be provided for controlling an AC motor which is powered by a DC source. This may be accomplished through the use of an inverter system which converts DC to AC power and which can be designed for variable frequency output.

SUMMARY OF THE INVENTION

It is an object of the present invention to provide an improved DC to AC inverter system.

It is a further object of the invention to provide a low cost reliable controller for generating AC power from DC sources.

It is still another object of the present invention to provide an improved induction motor speed control system wherein only DC sources are available for powering the motor.

It is another object of the invention to provide a controller that varies the number of pulses per half cycle to provide smooth low frequency operation without cogging.

It is yet another object of the invention to provide a controller for generating accurate selectable AC waveforms having frequencies of up to 400 hz from DC sources.

It is still a further object of the invention to provide an induction motor speed control system employing microprocessors and low cost parallel transistors to provide the control function.

Finally, it is an object of the present invention to provide a speed control system for an electrical vehicle which is powered by a DC source (e.g. battery).

According to an aspect of the invention there is provided a DC to AC inverter system, comprising microprocessing means; a plurality of counting means coupled to said microprocessing means for receiving data therefrom and for generating a plurality of square wave signals; driver means coupled to said counting means for receiving said square wave signals and deriving therefrom multiphase AC signals; and first means coupled to said microprocessor means for varying the frequency of said AC signals.

According to a further aspect of the invention there is provided an AC motor control system, comprising microprocessing means; a plurality of counting means coupled to said microprocessing means for receiving data therefrom and generating a plurality of multiphase digital signals; first means coupled to said counting means for receiving said digital signals and deriving multiphase AC signals therefrom for driving said AC motor; and feedback means coupled to said motor and to said microprocessing means for monitoring the speed of said motor.

According to a still further aspect of the invention there is provided a motor system for an electric vehicle comprising a DC source; microprocessing means; a plurality of counting means coupled to said microprocessing means for receiving data therefrom and generating a plurality of multiphase digital signals; first means coupled to said counting means for receiving said digital signals and deriving multiphase AC signals therefrom; an AC motor coupled to said first means and driven by said AC signals; feedback means coupled to said AC motor and to said microprocessing means for monitoring the speed of said motor; and second means coupled to said microprocessing means for varying the speed of said motor.

The above and other objects, features, and advantages of the present invention will be more clearly understood from the following detailed description taken in conjunction with the accompanying drawings, in which:

BRIEF DESCRIPTION OF THE DRAWINGS

FIG. 2 is a more detailed block diagram of the system shown in FIG. 1;

FIG. 4 is a circuit diagram illustrating the details of the pulse generator shown in FIG. 2;

FIG. 5 illustrates the details of the feedback module shown in FIG. 2;

FIG. 6 illustrates an over-current sensor;

FIG. 7 shows the various inputs to the A/D converter shown in FIG. 2;

FIG. 14 is a schematic diagram of a regeneration circuit;

FIG. 15A and 15B are simplified flow diagrams illustrating the overall control process;

FIG. 16 is a flow diagram illustrating a change routine;

FIG. 17 is a flow diagram illustrating a regulation routine;

FIGS. 18A and 18B are flow diagrams illustrating a start-up routine;

DESCRIPTION OF THE PREFERRED EMBODIMENT

Figure 1:
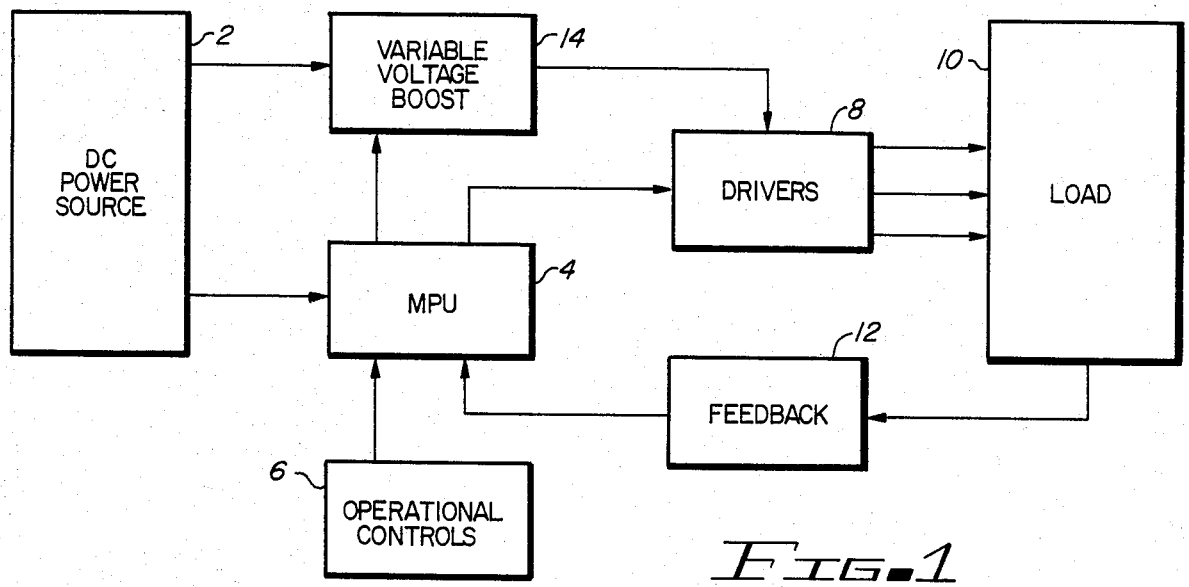
FIG. 1 is a block diagram of a controller system according to the present invention.

FIG. 1 is a block diagram of a controller system according to the present invention and includes a DC power source 2 (e.g. a battery), a microprocessor unit (MPU) 4, a source of operational controls 6, a plurality of drivers 8, a load 10 such as a motor, a feedback unit 12, and a variable voltage boost unit 14. While power source 2 is shown as a DC source, it should be understood that the DC power may result from rectification of an AC source.

The output of DC power source 2 is applied to MPU 4 and to variable voltage boost 14. Outputs from MPU 4 are supplied to variable voltage boost 14 and to driver circuits 8. Driver circuits 8 under the control of MPU 4 provide to load 10 three phase variable frequency AC power which are based upon desired motor/speed parameters. To achieve optimum efficiency over the entire speed of operation, a boost voltage from variable voltage boost 14 is supplied to drivers circuit 8 and varied as a function of load, slip and operating frequencies. Feedback circuitry 12 monitors the load and conveys current load parameters back to MPU 4. The system shown in FIG. 1 has four basic modes of operation designed to maintain high operating efficiency. The first mode occurs during start-up which corresponds to low frequency operation to provide high torque delivery capability. The second occurs when it is necessary to increase speed to a desired control value. The third mode corresponds to operation at a desired speed, and the fourth mode occurs at shut-down and/or regeneration during speed reduction or stopping.

FIG. 2 is a more detailed block diagram of the controller system shown in FIG. 1. Variable voltage boost 14 (FIG. 1) is now shown as boost positive unit 16 and boost negative unit 18. Boost positive 16 and boost negative 18 may be supplied with regeneration means 20 and 22, respectively. Regeneration will take place whenever the back electromotive force (EMF) is greater than the source voltage. In this case, current will be forced back into the source against the source voltage. Thus, the energy of the load is dissipated in the source and not in the motor.

Driver circuits 8 (FIG. 1) are functionally shown in FIG. 2 as first, second and third pairs of first and second series connected transistors. The output of each of these pairs is taken off their collector emitter junction and represents three phase AC signals which are applied to the load. These outputs are designated A, B and C. The bases of the first, second and third pairs of transistors are driven by phase drive units 24, 26 and 28, respectively, which are each, in turn, driven by the output of a run length timer (RLT) 30, 32 and 34, respectively.

Three operational control signals are shown in FIG. 2. The first is labeled footfeed and corresponds to a signal produced by the manipulation of an acceleration pedal on an electric vehicle. It should be understood, however, that this signal may be derived, in other applications, by the mere adjusting of a potentiometer. This signal is applied to analog-to-digital (A/D) converter 36 as is operational control signal labeled "boosted voltage" to be described more fully below. A third operational signal labeled "overcurrent" is supplied to MPU 38. The MPU 38 has a RAM 40 and an PROM 42 associated therewith. MPU 38 can access boost positive 16, boost negative 18, RLT timers 30, 32 and 34, A/D converter 36, RAM 40 and PROM 42 via decoding unit 44. MPU 38 also controls regeneration units 20 and 22.

A feedback signal indicative of rotor speed from, for example, a magnetic sensor, is applied to feedback module 12 which has an output coupled to timer 46. Timer 46 is also coupled to A/D converter 36 and decoding unit 44. Additionally, timer 46 provides interrupt signals to MPU 38.

Finally, pulse generating means 48 is coupled to positive boost 16, negative boost 18 and to the three phase driver circuits 24, 26 and 28.

When power is applied to the system, a reset signal is generated by reset block 50, which resets microprocessor 38, timer 46 and run length timers 30, 32 and 34. When the reset signal ceases, a start vector is generated which identifies where in the software program execution will begin. The start vectors are located in the top two bytes of the PROM memory 42 for MC 6800 type systems. The microprocessor 38 serves to locate the top two bytes in the PROM memory 42. Microprocessor 38 then initializes the system RAM 40 setting it to all zeros, and also establishes all constants necessary for use by timer 46 and A/D converter 36. The constants are those values associated with changing the number of pulses per half cycle as a function of frequency. Also, boost positive 16 and boost negative 18 are disabled by microprocessor 38 during initialization.

MPU 38 monitors analog-to-digital converter 36 to determine if a footfeed signal has been received which is sufficient to represent a desire to move. If this should occur, a stator frequency of approximately 5 hz is applied to the motor 10. By setting up the initial constant, using the MPU 38, a 5 Hz waveform and data is sequentially presented to the RLT's 30, 32 and 34. The stator frequency signal applied to the motor is at a power level sufficient to cause movement of the motor rotor via the torque generated by the applied field. The power wave is increased until the maximum torque limit is reached. Should the motor not turn with a 5 hz driving signal at maximum power, the frequency is reduced by MPU 38 to achieve higher torque at lower speed. The minimum operating frequency is approximately 1 hz.

The speed of the motor is monitored by feedback module 12 and computed by timer 14 and MPU 38. When a speed is within the slip range of the driving stator frequency, the driver (stator) frequency is increased incrementally to reach the desired drive speed. Should the rotor not come up to the desired speed at maximum power, the frequency is reduced by MPU 38 to maintain optimum efficiency with the desired torque. The microprocessor software routine then provides absolute control of the slip and the applied power in order to maintain the high efficiency, low slip condition required to provide smooth reliable operation. However, at higher frequencies, enough voltage may not be available to provide the horsepower requirements of the motor. The boost circuitry shown in FIG. 2 produces the required voltage increases. The boost circuitry (boost positive 16 and boost negative 18) output voltage level is controlled by microprocessor 38 by means of A/D converter 36 which receives a signal representative of the boosted voltage and converts that voltage to digital form for application to MPU 38. The maximum value of the boost voltage is ±110 volts or ±74 volts for the boost portion. In the disclosed system, a battery input of ±36 volts is utilized. The boosted portion of ±74 volts max is added to the ±36 volts to achieve the operating voltage. Thus, the output voltage may range from ±36 volts to ±110 volts. The boost voltage output may be controlled to within ±0.3 volts.

The pulses which are applied to the motor are generated using run length timers 30, 32 and 34 which are controlled by the microprocessor. The output of the run length timers (RLTs) are coupled into an appropriate full bridge transistor arrangement to switch the appropriate phase of the motor.

Figure 3:
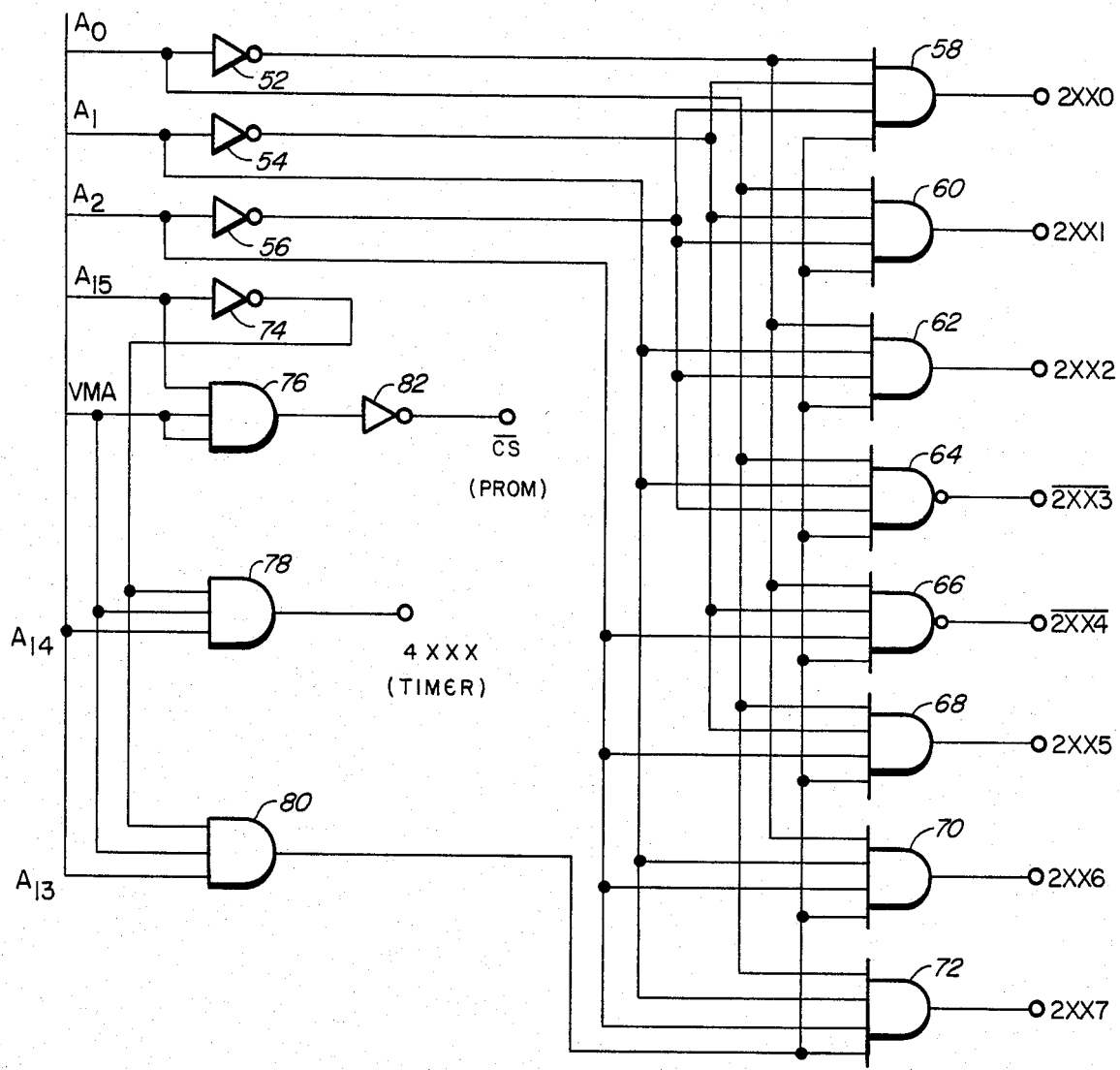
FIG. 3 is a logic diagram of the decoder shown in FIG. 2.

FIG. 3 is a logic diagram of decoding block 44 shown in FIG. 2. The circuit provides decoding for the microprocessor to provide address selection for the peripheral devices. This includes address selection for timer 46, PROM 42, RLTs 30, 32 and 34 and A/D converter 36. Decoding is done for the address in four different memory map areas. These are: (1) low memory (RAM) from 0 to FF (not shown in FIG. 3); (2) input/output address selection from $2,000_H$ to $2FFF_H$; (3) timer address selection from $4,000_H$ to $4FFF_H$; and (4) program memory from $8,000_H$ to $FFFF_H$. As can be seen from FIG. 3, address lines $A_0$, $A_1$, and $A_2$, from the MPU address and control bus are used to select addresses 2XX0, 2XX1, 2XX2, $\overline{2XX3}$, $\overline{2XX4}$, 2XX5, 2XX6 and 2XX7.

The complements of $A_0$, $A_1$ and $A_2$ are produced by inverters 52, 54 and 56, respectively. $A_0$, $A_1$ and $A_2$ along with the outputs of inverter 52, 54 and 56 are applied to a plurality of AND-gates 58, 60, 62, 68, 70 and 72 and NAND-gates 64 and 66 to provide the appropriate address decoding.

Address bit $A_{15}$ is applied to a first input of AND-gate 76 and to the input of inverting gate 74. The output of inverting gate 74 is applied to first inputs of AND-gates 78 and 80. Address bit $A_{14}$ is applied to a second input of AND-gate 78 and address bit $A_{13}$ is applied to a second input of AND-gate 80. A valid memory address (VMA) signal is applied to the remaining input of AND-gates 76, 78 and 80. The output of AND-gate 76 is applied to inverting gate 82 which produces the address select for PROM 42. The output of AND-gate 78 is the address select for timer 46, and the outputs of AND-gates 58, 60 and 62 are the address select signals for RLT timers 30, 32 and 34, respectively (see FIG. 2). Signals 2XX0, 2XX1 and 2XX2 access the run length timers. Signal $\overline{2XX3}$ is an A to D enable; signal $\overline{2XX4}$ is a special test function; signal 2XX5 is a phase control signal; signal 2XX6 is a special test function; and signal 2XX7 is a boost run length data latch. In this illustration, the actual addresses are $\overline{2003}$, $\overline{2004}$, 2005, 2006 and 2007.

The address decoding shown in FIG. 3 may be accomplished using CMOS devices such as those bearing part numbers MC 14073, MC 14049, MC 14012 and MC 14082, commercially available from Motorola, Inc. The CMOS devices were selected because CMOS permits almost zero loading of the MPU bus which allows for direct decoding of the address bus without buffering. Should buffering be required, low cost TTL or LS could be used. The valid memory address (VMA) line has been utilized in the decoding to assure that only valid memory addresses from the MPU (e.g. MC 6802, available from Motorola, Inc.) are recognized and decoded.

Figure 10:
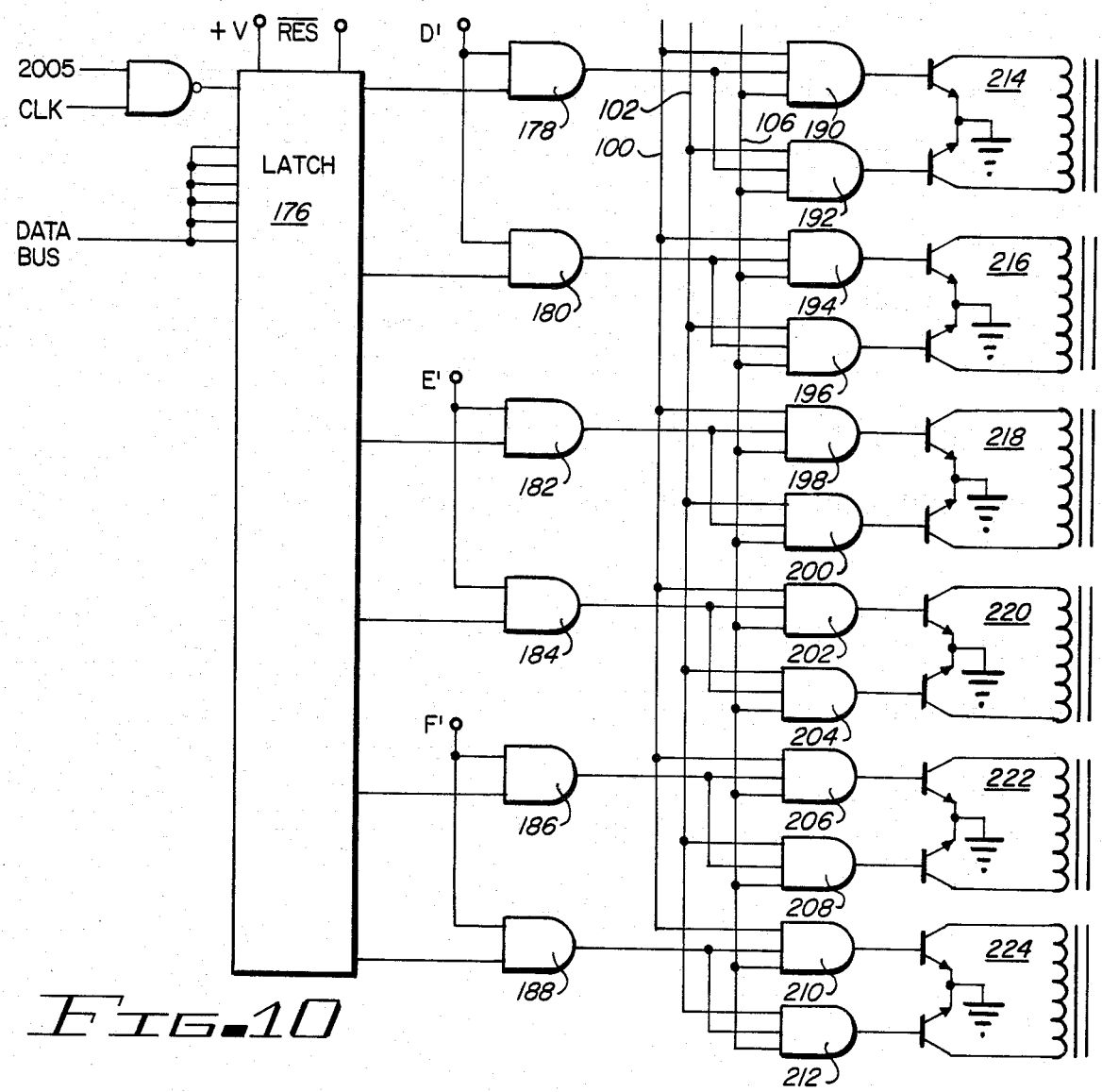
FIG. 10 illustrates a portion of the driver circuits shown in FIG. 2.

FIG. 4 illustrates the details of the pulse generator circuit 48 shown in FIG. 2. This circuit generates the frequency used by the transistor drivers to couple long pulses through a small transformer. Delayed "turn on" is provided by using a monostable multivibrator. The oscillator used here operates at about 40 khz to provide the required wave output, and a divide by 2 circuit is employed. A CMOS relaxation type (RC) oscillator is used to generate the 40 Khz output waveform. The oscillator comprises first and second NAND-gates (or inverters) 84 and 86, resistor 88 and capacitor 90. When power is supplied to the gates, the circuit automatically starts charging and discharging the capacitor through resistor 88 to generate an output waveform. This waveform is shaped and delayed by NAND-gate (or inverter) 92, capacitor 96, and NAND-gate (or inverter) 94 and is then applied to the clock input of delay type flip-flop 98 (e.g. MC 14013, available from Motorola, Inc.). The output of this flip-flop is a divide by 2, 20 Khz square wave which appears at terminal 100. The complement of this signal appears at terminal 102. The undelayed output of the oscillator is applied to monostable multivibrator 104 (e.g. MC 14528, available from Motorola, Inc.) which, in turn, generates a narrow pulse each time the oscillator produces a rising edge on its output. This pulse appears at terminal 106 and is used to provide a blanking delay to the push-pull inverters, six of which are shown in FIG. 10 (214, 216, 218, 220, 222 and 224).

FIG. 5 illustrates in detail the feedback module 12 shown in FIG. 2. An input from the magnetic sensor which monitors rotor speed is coupled to the feedback module at terminals 108 and 110 and the output of feedback module (terminal 112) is coupled to timer block 46, shown in FIG. 2. The magnetic sensor generates a series of pulses corresponding to teeth on the rotor, and timer 46 measures the elapsed time between pulses. This time between pulses is a direct function of rotor speed and can be used to determine slip. The output of the magnetic sensor is a sine-wave which can vary in amplitude from 3 or 4 volts up to 50 or 60 volts. It is coupled through a resistor 114 and clamped with Zener diode 116 and diode 118. It is then applied to a first input of comparator 120 of a type, for example, bearing part number MC 3302 and manufactured by Motorola, Inc. The second input of a comparator 120 is coupled to ground via resistor 122 and is also coupled to the output of comparator 120 via resistor 124. The output of comparator 120 is coupled to a source of supply voltage via resistor 126 and to ground via capacitor 128. The output of comparator 120 is essentially a square wave; however, since this circuit detects zero crossings to achieve the output waveform, the output may not be exactly square. To remedy this, the output waveform is double buffered in gates 130 and 132.

FIG. 6 illustrates an over current sensor which may be employed to protect against too much current flowing through any of the transistors. Terminals 134 and 136 are coupled across an over current shunt in the ground or battery return lead. It has very low resistance and is capable of generating a voltage drop of about 50 mv at the over current sense point. Terminal 134 is coupled to a first input of a comparator (e.g. MC 3302, available from Motorola, Inc.), and terminal 136 is coupled to a second input of comparator 140 via variable resistor 138. The output of comparator 140 is coupled directly to the highest priority interrupt of the microprocessor. In the case of an MC 6802 microprocessor manufactured by Motorola, Inc., the highest priority interrupt is known as the NON MASKABLE INTERRUPT (NMI). It is so named since this interrupt will be serviced immediately regardless of the present operation of the microprocessor.

Referring to FIG. 7, it is again illustrated that footfeed information and boost voltage information are applied to inputs of analog-to-digital converter 36. The footfeed information may be derived from, for example, a potentiometer 144 and is applied along conductor 142 to a first input of A/D converter 36. Similarly, the boost voltage is taken from a voltage divider arrangement 146 and applied to a second input of A/D converter 36. A/D converter 36 is an eight bit, eight channel multiplexed input device that is capable of monitoring the operation of eight analog inputs. A signal labeled $\overline{2003}$ and applied to first inputs of gates 148 and 150 will provide a start conversion signal. A read/write (R/W) is applied to a second input of gate 148 and the absence of a read/write ($\overline{R/W}$) is applied to the second input of gate 150. The output of gate 150 is applied directly to an output enable input of the A/D converter. The output of gate 148 is applied to the first input of NOR gate 152, the second input of which is coupled to an end of cycle signal generated by A/D converter 36. The output of NOR gate 152 is inverted and applied to a start input of A/D converter 36 which begins the conversion. The output of A/D converter 36 (D0-D7) is a digital representation of a value on the selected analog channel. This is, it could be a digital representation of either the footfeed voltage or the boost voltage. The data D0-D7 may then be conveyed in parallel to the microprocessor. The ADA, ADB, and ADC are input select lines to the A to D converter which provides the means of selecting one of eight analog channels of the converter. A8, A9 and A10 are the MPU address lines used to select which input is latched for use.

Figure 8:
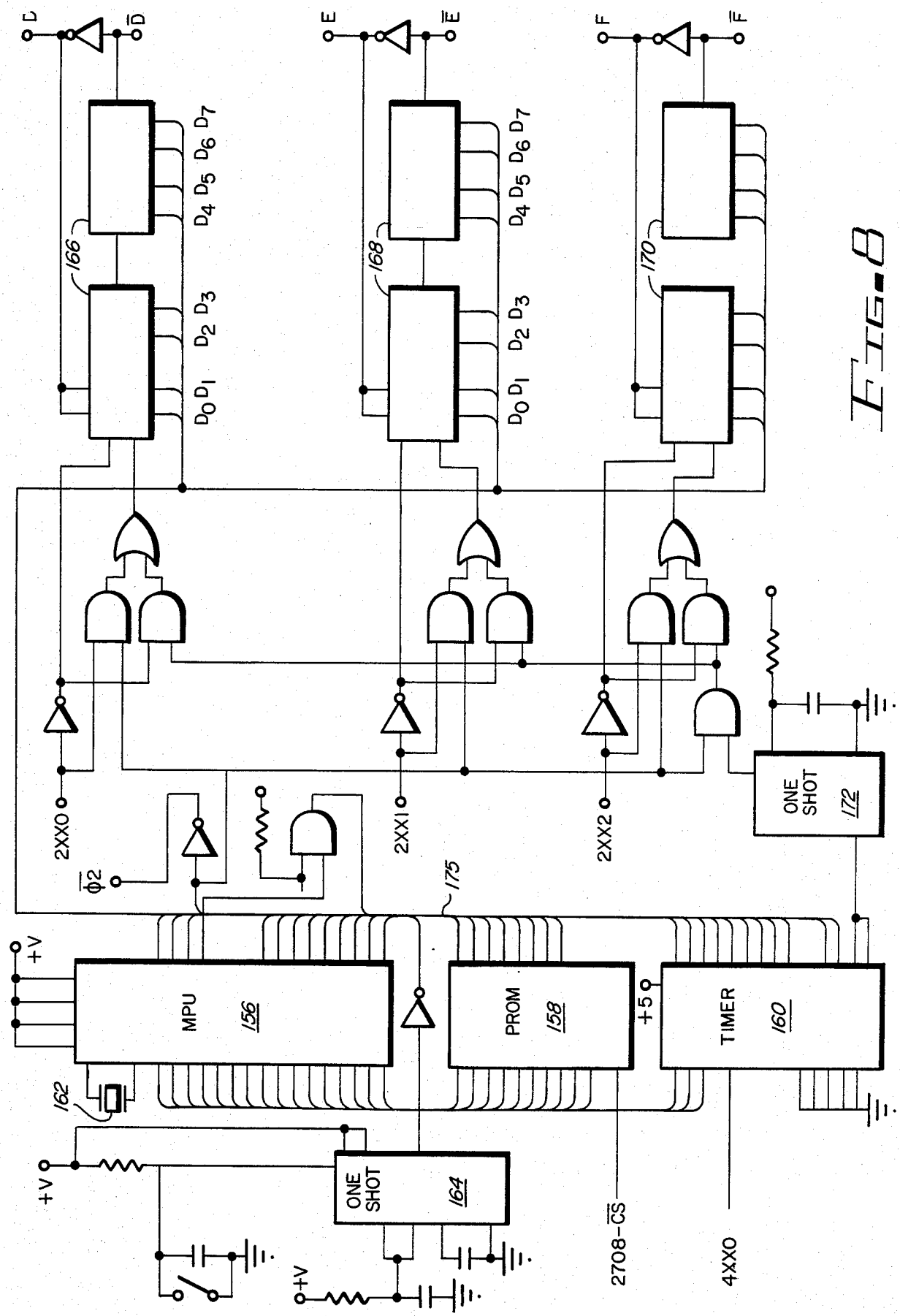
FIG. 8 illustrates in greater detail the relationship between the MPU and run length timers shown in FIG. 2.

FIG. 8 illustrates in block and logic form the MPU 156, PROM 158, the timer 160, and RLT's 166, 168 and 170. A start-up circuit 164 is also included and may comprise a one shot (e.g. MC 1455).

Timer 160 (e.g. an MC 6840) comprises three internal timers. Each may be independently set or programmed to provide various timing functions. One of these timers is used to measure the interval between teeth on a gear attached to the rotor in order to determine rotor speed and slip. The second timer is used to count the pulses between pulse period interrupts and the third timer controls the output frequency which controls the count in the RLT's and counts the pulse interval between interrupts. By varying the frequency of this output, the exact frequency (i.e. motor frequency) can be varied from 1 hz to 100 hz in any small increment. Use of the timer in conjunction with the software permits the number of pulses per half cycle of output to be varied, for example, from 30 at 5 hz to 9 at 80 hz. This provides high torque at low frequency and low switching loses and high horsepower at high frequency.

Microprocessor 156, preferably an MC 6802 manufactured by Motorola, Inc., is an eight bit processor with an eight bit data bus and a 16 bit address bus. It has an "on board" clock circuit which is used to provide the system clock. A 4 Mhz crystal 162 is used as an input to this clock and the output is a 1 Mhz square wave. Other control lines such as the non-maskable interrupt (NMI) line, the standard interrupt line (IRQ), a valid memory address (VMA) line and a reset line are provided. Inputs to the microprocessor are provided from the address selector (which is the decoder block 44 shown in FIG. 2), and are used along with the clock to write information into the run length timers 166, 168 and 170. The run length timers are reset to a new value each time a pulse update interrupt is encountered which triggers one shot 172. The output of one shot 172 is applied to the control logic which causes the RLT's for the three phases to be simultaneously updated. The update is made every 6 degrees at low frequencies. Software is housed in PROM 158 (preferably comprised of MC 2708 PROMS manufactured by Motorola, Inc.). They are addressed by any hexidecimal address above 8000.

Figure 9:
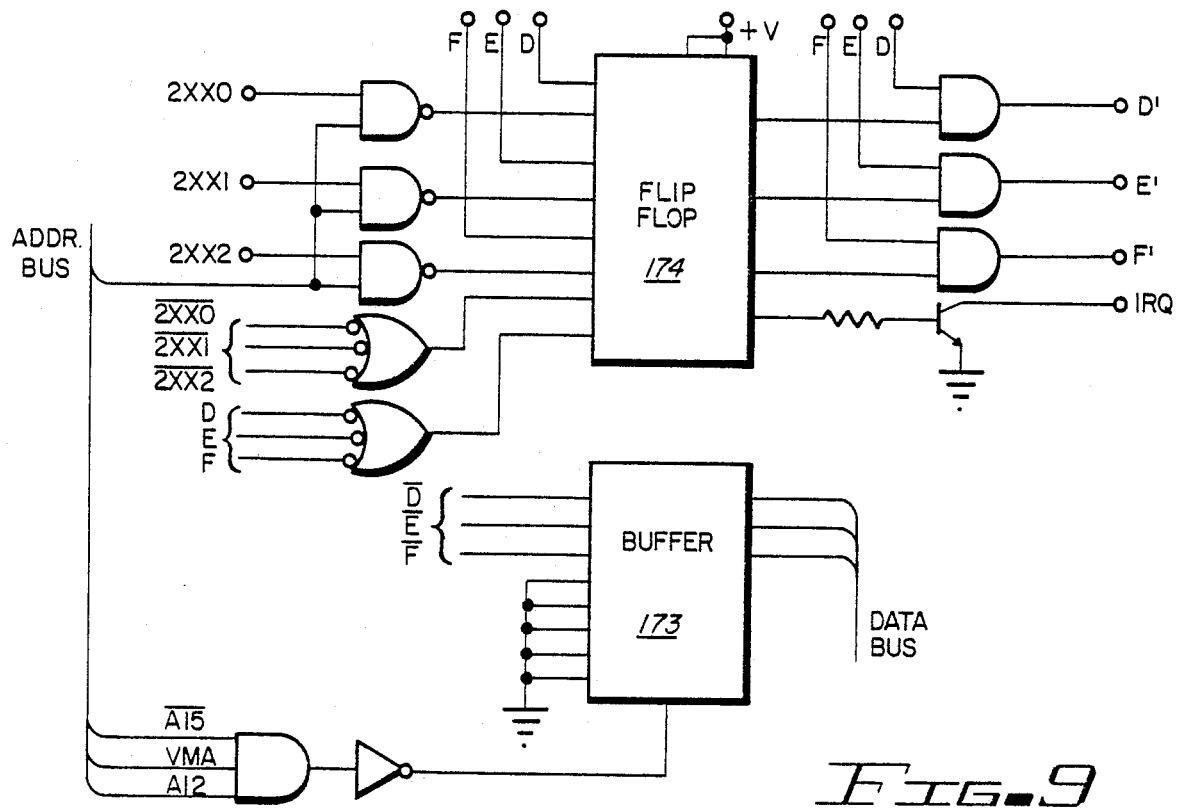
FIG. 9 illustrates a system which can be used with the system of FIG. 8 to control both "on" and "off" time.

Of course, it is possible to control both the on time and the off time of the modulated pulse train for each phase of the motor. Each phase would then be independent with control being derived from an interrupt drive source. The same RLT's would be used in both methods; however, each RLT must first count down for the on time and then for the off time. When counting down for the off time, the RLT outputs must be blocked so that a zero voltage is applied to the output. Such an arrangement is shown in FIG. 9. The timers not only respond to the hexidecimal addresses 2000; 2001 and 2002, but also the hexidecimal addresses 2008; 2009 and 2000A. When addresses 2008; 2009 and 2000A are presented to the RLT's, they are recognized and set the appropriate set/reset flip-flop 174 (e.g. an MC 14044 manufactured by Motorola, Inc.). The appropriate flip-flop 174 is reset by the timing out of its respective run length timer. Interrupt line (IRQ) is pulled low whenever an RLT times out so as to permit data to be sent to the RLT. Once the data has been placed into the RLT, the IRQ line is again forced high. Status information concerning the particular RLT that has timed out is read using address hexadecimal 1000. This status information is placed on the three lower order data lines. The outputs of the RLT's 30, 32 and 34 (see FIG. 8) are D, $\overline{D}$ (RLT 30), E, $\overline{E}$ (RLT 32), and F, $\overline{F}$ (RLT 34). The inputs for the RLT's 30, 32 and 34 are 2XX0 (for RLT 30), 2XX1 (for RLT 32) and 2XX2 (for RLT 34). Inputs 2XX0, 2XX1 and 2XX2 come from the decoder 44. The inputs to the run length times 166, 168 and 170 (corresponding to RLT's 30, 32 and 34) are $D_0$-$D_7$ which are derived from the Data and Address Bus line. Buffer 173 (for example an MC 14503) is a tri-state Hex Buffer. Lines $\overline{D}$, $\overline{E}$ and $\overline{F}$ are shown as the outputs of the RLT's in FIG. 8.

FIG. 10 illustrates a portion of the three-phase driver circuits. Phase relationships are maintained by setting a D-type latch 176 (e.g. MC 14174 manufactured by Motorola, Inc.). The information in the latch is coupled to the push/pull interrupt transistors by using a plurality of two and three input AND-gates (e.g. MC 14073 and MC 14081 manufactured by Motorola, Inc.). A modulated pulse train is present at AND-gates 178, 180, 182, 184, 186 and 188 coupled to lines D', E' and F', which are the three output lines from the MC 14081 AND-gates. From the appropriately enabled gate, the modulated pulse train is gated through the three input AND-gates 190-212 by output signals 100, 102, and 106 (see FIG. 4) to the selected inverter where the pulses are coupled at a high frequency (20 khz) to the appropriate phase driver input circuit, one of which is shown in FIG. 11.

Figure 11:
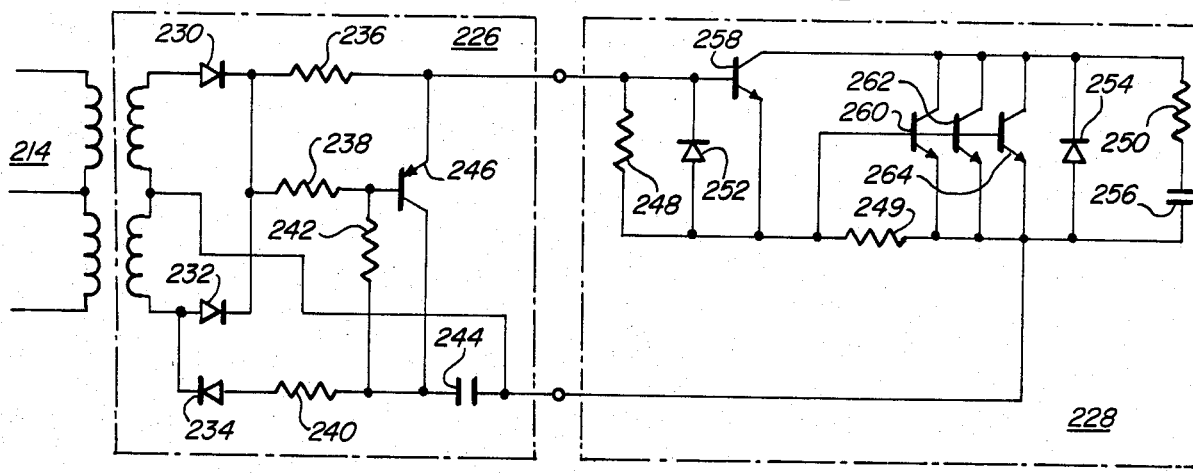
FIG. 11 illustrates the phase driver input circuit.

The circuit in FIG. 11 comprises a rectifying stage 226 and a parallel transistor stage 228. The rectifying stage includes diodes 230, 232 and 234, resistors 236, 238, 240 and 242, capacitors 244 and transistor 246. This portion of the circuit rectifies the high frequency pulses to provide the drive for the phase switching of the parallel transistors that are used to generate the three phase waveform. The parallel transistor stage comprises resistors 248, 249 and 250, diodes 252 and 254, capacitor 256 and transistors 258, 260, 262, and 264, which provide the required three phase waveform. When the high frequency input is being rectified by rectifying stage 226, the circuit is also being used to develop the negative bias used to shut off the phase drivers when the coupled high frequency signals are no longer present.

Figure 12:
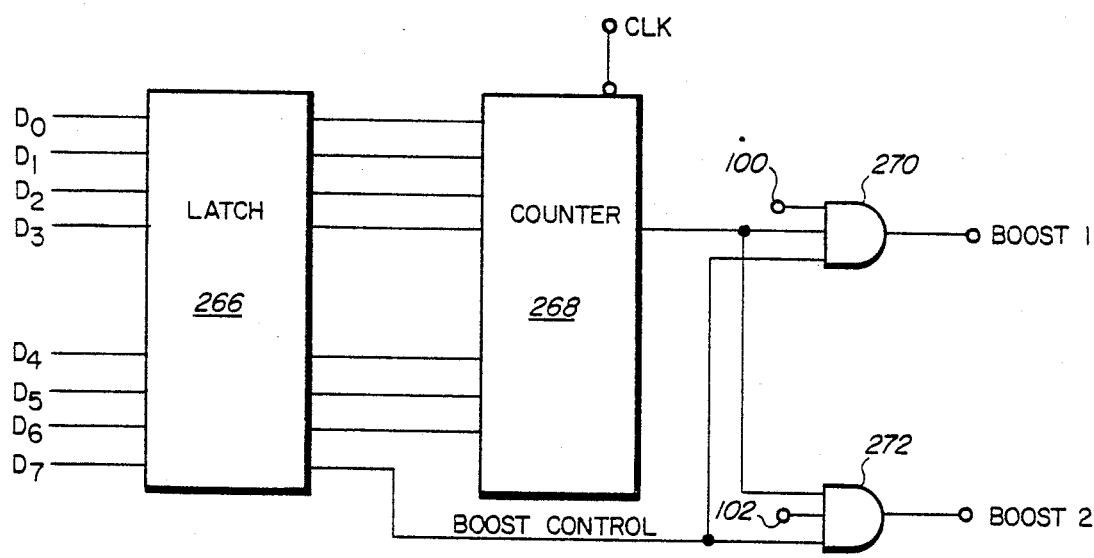
FIG. 12 illustrates the boost control circuitry.

FIG. 12 illustrates the boost control circuit and how it interfaces with the microprocessor. The circuit consists of a latch circuit 266 (preferably comprised of a plurality of MC 14174 latch circuits manufactured by Motorola, Inc.) and a counter timer (RLT) 268. At the start of each period, counter 268 is loaded with the contents of latch 266 which has applied to its input data bits $D_0$-$D_7$. When the latch is in the all zero condition, or when $D_7$ is zero, no boost pulse is generated. When $D_7$ is high, output pulses are generated based upon the contents of the latches. If the contents of the latch is small, the output is small, and when the contents of the latch is increased, the output increases correspondingly. Counter 268 is capable of counting from 0 to 128. These counts preferably all occur within a twenty-five microsecond period; thus, the counter must be low power transistor-transistor logic or LS. An output of the latch circuit and an output of the counter circuit are applied to first and second inputs of AND-gates 270 and 272, the outputs of which correspond to the boost signals which are directed to the boost driver circuits. The drive signals 100 and 102 are used to create the switching frequency for the boost.

Figure 13:
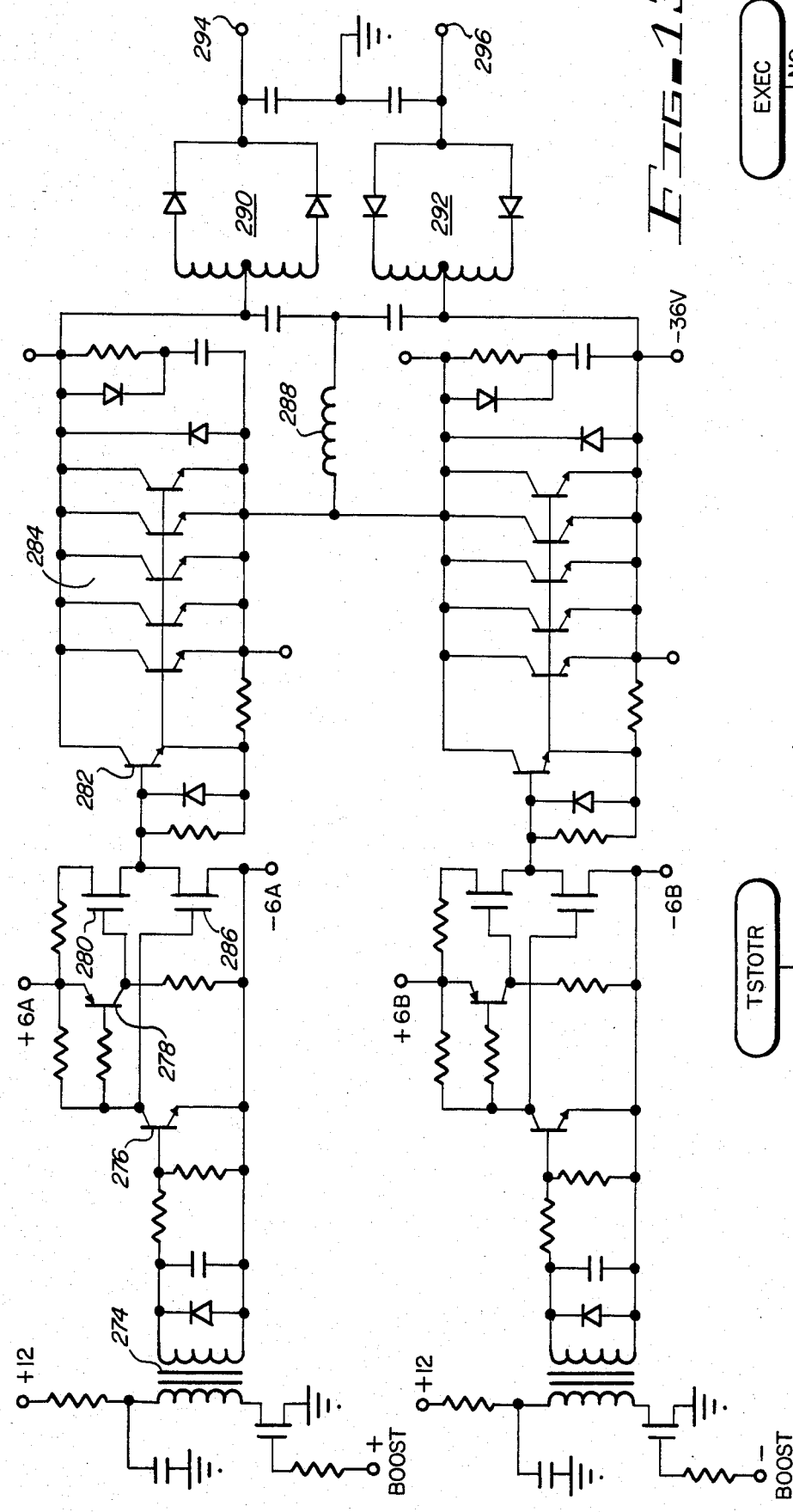
FIG. 13 is a schematic diagram of the boost module employing a half-bridge arrangement.

FIG. 13 is a schematic diagram of the boost module employing a half bridge arrangement and illustrates how the difference boost in generated. As can be seen, the boost voltage is isolated from the microprocessor by transformer 274. The output of transformer 274 is coupled to a drive circuit which includes a transistor 276 and a transistor 278. When a positive input is received at the base of transistor 276, power field effect transistor (driver) 280 provides a driving voltage which drives parallel transistor 282 which, in turn, drives power transistor bank 284. When no drive is provided to transistor 276, power field effect transistor 286 clamps off transistor bank 284.

Since the upper and lower portions of the schematic diagram in FIG. 13 are identical, it is not deemed necessary to describe the lower portion. However, by alternately driving the parallel banks of transistors of the upper and lower portion there is provided a voltage across the output transformer 288. This voltage is coupled via rectifier diodes 290 and 292 to output terminals 294 and 296 where it is available for addition to the battery voltage so as to achieve proper motor drive voltage.

Referring to FIG. 14, a schematic diagram of the regenerative circuit is shown that is used to control the maximum allowable voltage at the output drive. This circuit can function with both hardware (over voltage protectors) and software (by MPU operation). The hardware method applies pulses into the bases of transistors 200 and 202 whenever the voltage across the output exceeds the preset reference voltage of ±110 volts (for this application). Overvoltage is detected with a positive and a negative voltage comparator (204 and 206), the output of which goes low on detection. This allows for the use of a "wired OR" output. This low true output signal is inverted by inverter 208 and coupled through an OR Gate 210. The output of this OR Gate 210 is one of the inputs to a 2 input AND-gate 212 (type MC 14081 or equivalent). The other input to the AND-gate 212 is the 100 signal from the oscillator circuit (see FIG. 4). The output of this gate when enabled is a 20 Khz square wave. This wave is coupled to a power FET 214 which drives the base of the upper and lower regeneration transistor 200 and 202. These transistors bypass the rectifier diodes used in the boost to couple power back into the battery. When the regenerative circuit is turned on, the boost circuit is turned off.

Figure 15B:
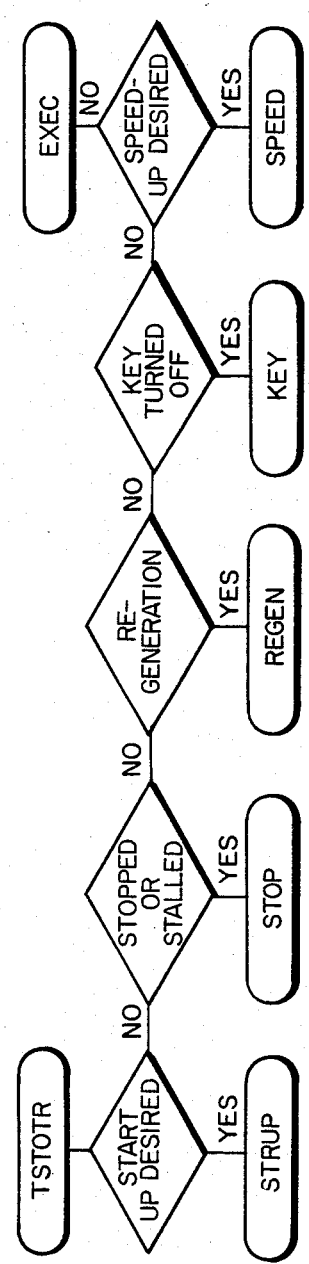

Referring to FIGS. 15A and 15B, initially the software is entered at the label "Start". First the system is initialized. Next certain constants regarding timing, pulses per half cycle and pointers (software) are set up. The software now falls into the executive loop called "EXEC". In this loop the footpedal is read and condition status bits are set for startup, slowed down, speeding up, regulation, regeneration, stopped or stalled. This status word contains set information which is acted upon later in the activity decision block. After the footpedal processing, the next routine encountered is the test for a change in direction. When this occurs, a change flag is set. All activity is monitored by the activity decision block. When activity is encountered, the yes decision on this block is taken. The first test is to see if a change in direction is desired. This is followed by a test to see if the motor needs to slow down. After this, a check is made for regulation mode. When none of the above are the selected decisions, the code flow is out through TSTOTR. This path leads to further decisions for start-up decision, stopping or stalled, regeneration, key turned off, or speed up decision. In general, only one flag is set at any one time and the code flow is directed to the desired action.

When no action is required the decision at the activity block is no and the code flow is such that EXEC1 is entered. The next check is to find out if the motor rotor is turning. When the answer is "no" the code flow is such as to cause the return to the "EXEC" routine. When the answer is "yes", the Motor Was Already Moving flag is tested. When it is set, the slowed routine is set such that the next time through the activity block, the slowed routine can be entered.

As can be seen from this flow chart, the operation of the software is performed in any number of modes depending upon the desired inputs and the characteristics of the motor. These modes of operation are:
1. Change in Direction—Often the operator desires to go in reverse when he was previously going forward. To do so he simply turns the forward switch to the reverse position. The controller brings the motor to a complete halt and then starts it in the other direction.
2. Slowed Down—Often the operator decides to decrease his operating speed by reducing the footpedal input. When this happens, the processor systematically slows down the motor as if it was coasting to a stop.
3. Regulation—Once the desired speed is reached, the regulation routine is used to hold the rotor speed of the motor very close to the stator speed to achieve good efficiency.
4. Starting Up—When first starting up it is desirable to reach a speed of 5 Hz as soon as possible. This is achieved with the start-up routine which increases power until 5 Hz is reached. When this speed is not attainable the motor stator frequency is decreased towards 1 Hz in a systematic fashion maintaining the maximum V/F ratio, which will not cause saturation of the motor. Since the rotor and stator speed have achieved a relationship when they are within 20% of each other, the speed routine is then used to bring the speed of the motor up to the desired operation speed.
5. Stopped or Stalled—Sometimes the wheel of the vehicle falls into a hole, gets caught or stuck, and motion of the vehicle decreases very rapidly. When this mode of operation is entered this routing brings the system back up to speed in a smooth and rapid manner.
6. Regeneration—Sometimes when going down a hill or rolling backwards, excessive energy is generated. When this happens the processor and/or hardware logic causes this power to be coupled back to the batteries.
7. Key Turned Off—When the key is turned off and the system is running, systematic shut-down must occur. This is accomplished by setting up the system in a manner that disengages all drive signals to the motor.
8. Speeding Up—When starting up or making large changes in the desired speed, this routine is used to rapidly achieve the desired speed. Once at the desired speed, this routine sets up the entrance into the regulation routine.

Referring to FIG. 16, a more detailed flow chart of the change desired and the slowed routine is shown. This shows how the FIND routine is used in conjunction with reduced power and waveform adjust routines to obtain the slowing feature. The heart of all of the processing mode routines is the FIND routine. This routine determines a constant which is the time measured between two teeth on the gear, multiplied by a stator frequency. When stator and rotor frequencies are the same (no slip), this value is a constant. Note also that once the change has been executed, the slowed routine is entered.

Figures 17, 18A:
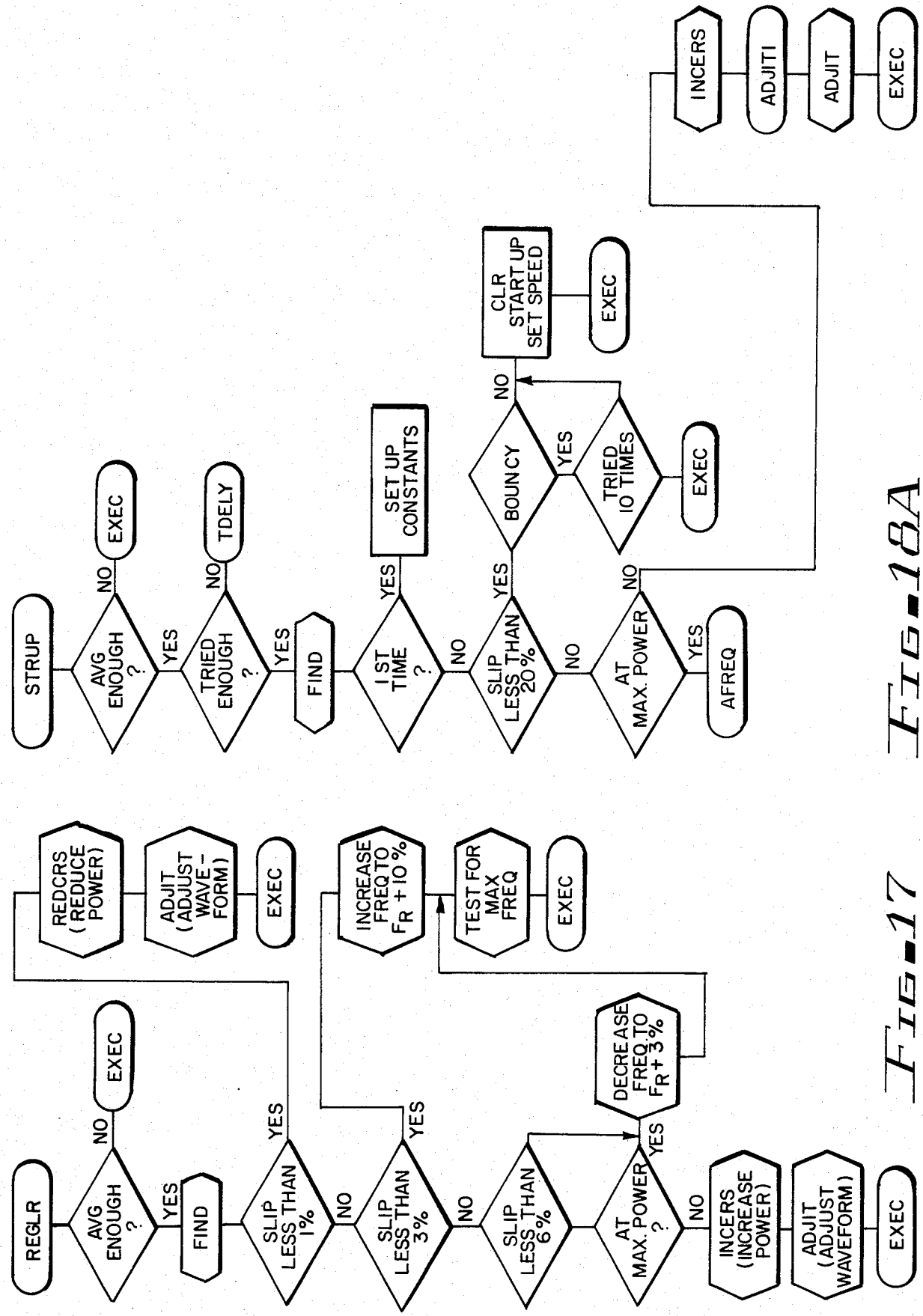

Referring to FIG. 17, the regulation routine is shown. This routine causes the previously described Reduce, Increase, Adjust and Change frequency routines to maintain the slip between 1 and 6%.

Referring to FIGS. 18A and 18B, the flow chart is entitled STRUP, which stands for start up. This routine processes the data to obtain the rotor frequency within 20% of the stator frequency. Once 20% is reached, the speed routine is entered.

Figure 19:
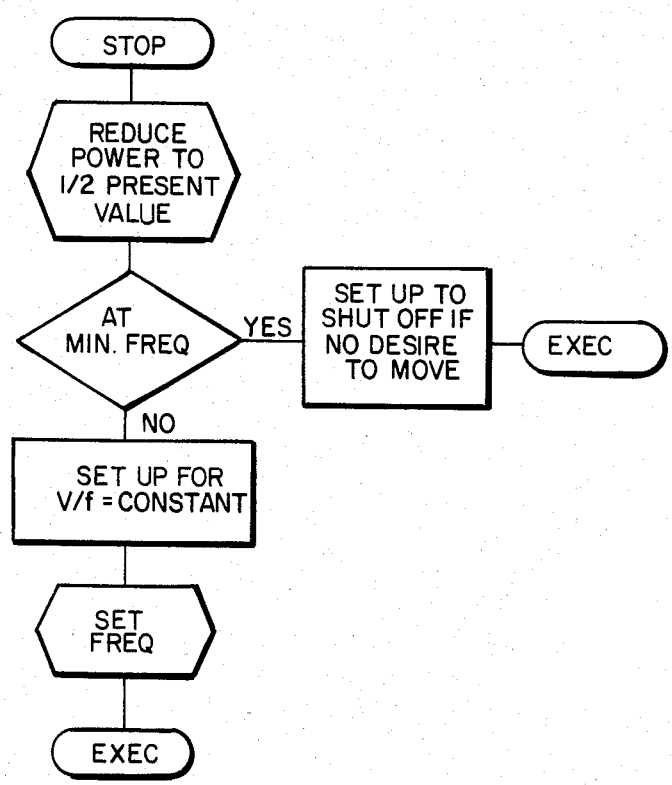
FIG. 19 is a flow diagram illustrating a stop or stalled routine.

Referring to FIG. 19, this flow chart is the stop or stalled routine. It is used when the motor stalls for any reason. It slows the frequency to a level which provides the necessary torque to again start the motor and bring it up to frequency.

Figure 20:
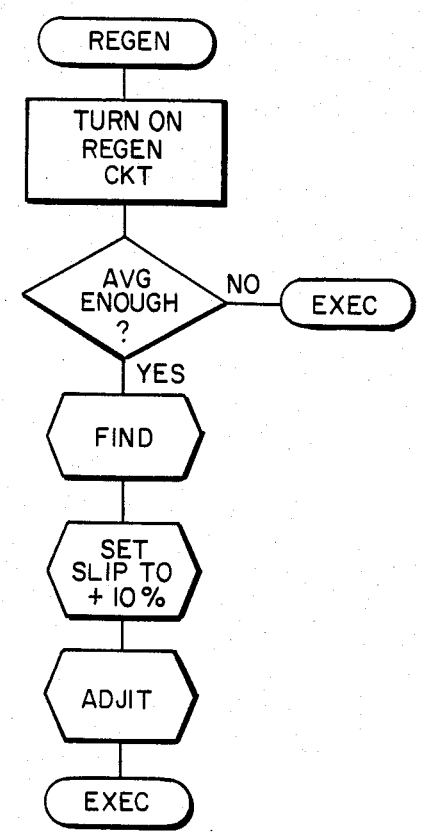
FIG. 20 is a flow diagram illustrating a regeneration routine.

Referring to FIG. 20, the flow chart shows the use of regeneration to achieve breaking and recovery of excess energy. The stator frequency is now 10% less than the rotor frequency, which allows the motor to give up energy.

Figure 21:
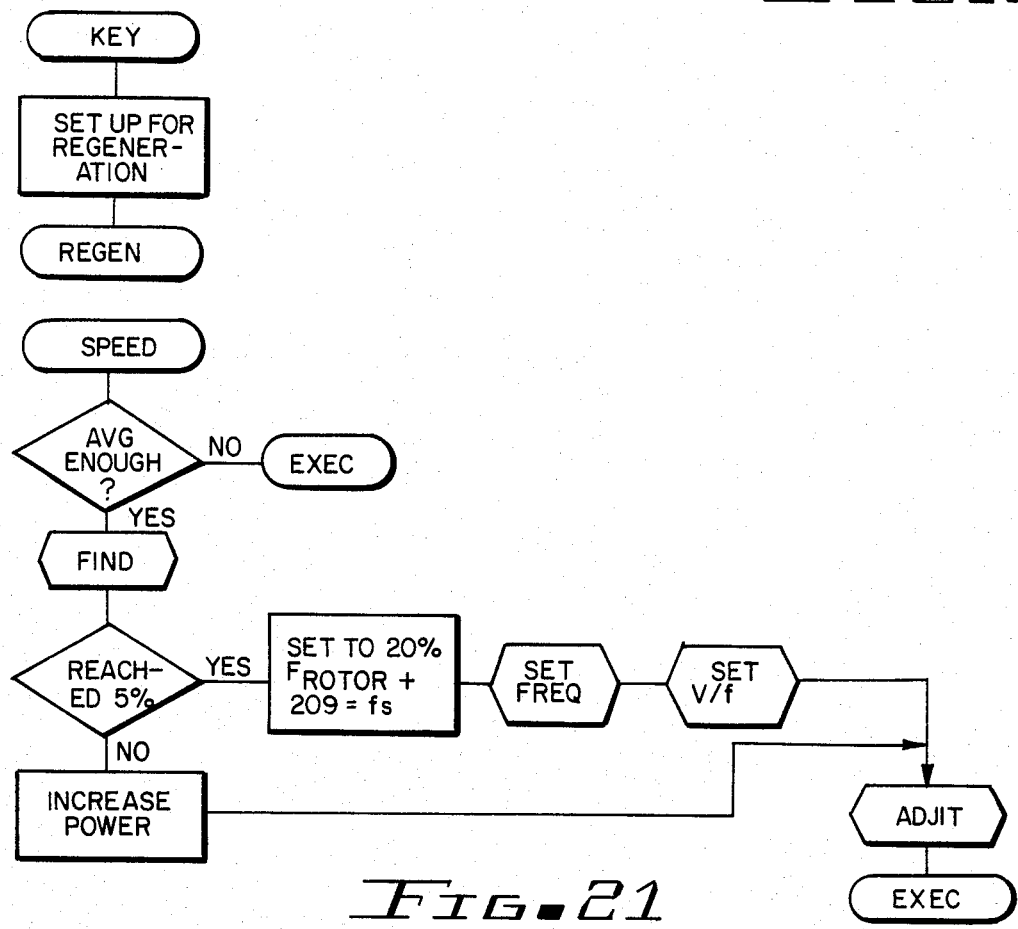
FIG. 21 is a flow diagram illustrating a key and speed-up routine.

Referring to FIG. 21, the flow chart is the key turned off and the speeding up routines. When the key is off, regenerative breaking is used. When speeding up, the stator frequency is increased 20% each time the rotor frequency is within 5% of the stator frequency.

It is to be understood that the above description of a preferred embodiment is given by way of example only. Changes in form and details may be made by one skilled in the art without departing from the scope of the invention as defined by the appended claims.

We claim:
1. A DC to AC inverter system, comprising:
microprocessing means;
a first plurality of counting means each coupled to said microprocessing means for receiving data therefrom and for generating a plurality of square wave signals;
a second plurality of driver means, each one of which is coupled to a different one of said first plurality of counting means for receiving the square wave sig- nals generated thereby and deriving therefrom one phase of a multiphase AC signal; and first means coupled to said microprocessor means for varying the frequency of each phase of said multiphase signal by varying the contents of each of said first plurality of counting means associated with each of said second plurality of driver means.

2. A system according to claim 1 wherein three of said counting means are employed to generate three-phase AC power.

3. A system according to claim 1 wherein said microprocessing means comprises:

a microprocessor;

memory means coupled to said microprocessor; and address selection means coupled to said microprocessor, said memory means and said plurality of counting means for accessing said memory means and said plurality of counting means.

4. A system according to claim 3 wherein said memory means includes a random access memory and a programmable read-only memory.

5. A system according to claim 3 further including a variable voltage boost means coupled to said microprocessing means and to said driver means and controlled by said microprocessing means for supplying a variable boost voltage to said driver means.

6. A system according to claim 5 wherein said boost means is equipped with regeneration means for dissipating excess current.

7. A system according to claim 6 wherein said boost means provides both positive and negative boost voltages to said driver means.

* * * * *